UNITED STATES PATENT OFFICE.

GEORGE A. WILSON, JR., OF BOSTON, MASSACHUSETTS, ASSIGNOR TO CAROLINA PAVEMENT COMPANY, OF BOSTON, MASSACHUSETTS, A CORPORATION OF MASSACHUSETTS.

METHOD OF TREATING BITUMINOUS SUBSTANCES.

1,394,874.     Specification of Letters Patent.     Patented Oct. 25, 1921.

No Drawing.     Application filed January 21, 1920. Serial No. 353,096.

*To all whom it may concern:*

Be it known that I, GEORGE A. WILSON, Jr., of Boston, in the county of Suffolk and State of Massachusetts, a citizen of the United States, have invented a new and useful Improvement in Methods of Treating Bituminous Substances, of which the following is a specification.

My invention has for its object a method of treating bituminous substances such as crude oil, asphalt, etc., for the purpose of making them harder or tougher so that they will resist penetration to a high degree and in the case of oils raising their flashing point and lowering their freezing point. The product of this method is a bituminous composition from which many of the volatile oils have been abstracted and the particles of which are caused to cohere to form, especially when used as a pavement or as a cement or paint, a material which is hard under all weather conditions, does not soften under the influence of a hot smmer sun, nor does it become brittle in frosty weather, because it contains a material which acts much as does a flux or binder, serving to bind the particles of the bituminous matter together and make a homogeneous mass.

In carrying out my invention I use with the bituminous foundation by preference borax ($Na_2B_4O_7 \cdot 10H_2O$) which I have found after giving off its $H_2O$ amalgamates with the bituminous matter so as to toughen it instead of acting merely as an inert filler. Moreover, the amount of $H_2O$ contained in borax is such as when sufficiently heated to act as a carrier for a great deal of the light oil which the bitumen contains and which is thrown off under heat.

When applied to commercial asphalt my process consists in introducing borax at atmospheric temperature into asphalt which has been heated to approximaely 400° F. For paving purposes, for example, to 2000 lbs. of asphalt of a penetration of say 40-50, heated to say 400°, I add one per cent. by weight (20 lbs.) of borax. The water of crystallization of the borax is immediately eliminated and an emulsion or foaming condition ensues, leaving the residue of the borax in union with the asphalt. An oxidizing effect also takes place due to the withdrawal of hydrogen from the hydrocarbon colloids and disposals of the bitumen, and at the same time the temperature increases slightly due to the reaction. The borax unites with the bitumen as a binder, producing a composition which will not deteriorate materially with age, climate, air or water, and when used in the usual way with a mineral aggregate to form a street pavement, is far superior to all other asphalts of which I have knowledge. The use of a borax with asphalt as above described I have found will produce, weight for weight, a material having a greater resistance to wear from the external force of crushing, impact, shear and tension, and the material can be made at less cost than any other like composition.

I do not mean to limit myself to the exact proportions nor temperatures named, nor do I confine the invention to the use of borax as there are other materials which may be rendered anhydrous and will then unite with bitumen as a binder rather than as a filler.

When the product is not to be used for paving an asphalt of higher penetration may may be used and with a slightly less percentage of borax.

I prefer to use commercial borax ($Na_2B_4O_7 \cdot 10H_2O$) in carrying out the above process though borax in other forms may be used (for example borate of lime) in which case the other element remains substantially inert so far as the asphalt is concerned. The volatile oil may be reclaimed for other uses if desired.

What I claim as my invention is:—

1. That process of making a bituminous cement which consists in adding to a given quantity of bitumen heated to approximately 400 degrees F. approximately one per cent. of borax and allowing the escape of the volatile oils.

2. A bituminous cement comprising bitumen and substantially less than one per cent. of anhydrous borax.

3. A bituminous cement from which volatile oils have been removed and comprising bitumen and approximately one per cent. of borax.

4. A bituminous cement or the like comprising a bituminous material from which the highly volatile oils have been removed, and anhydrous borax.

GEORGE A. WILSON, JR.